United States Patent Office 2,834,923
Patented May 13, 1958

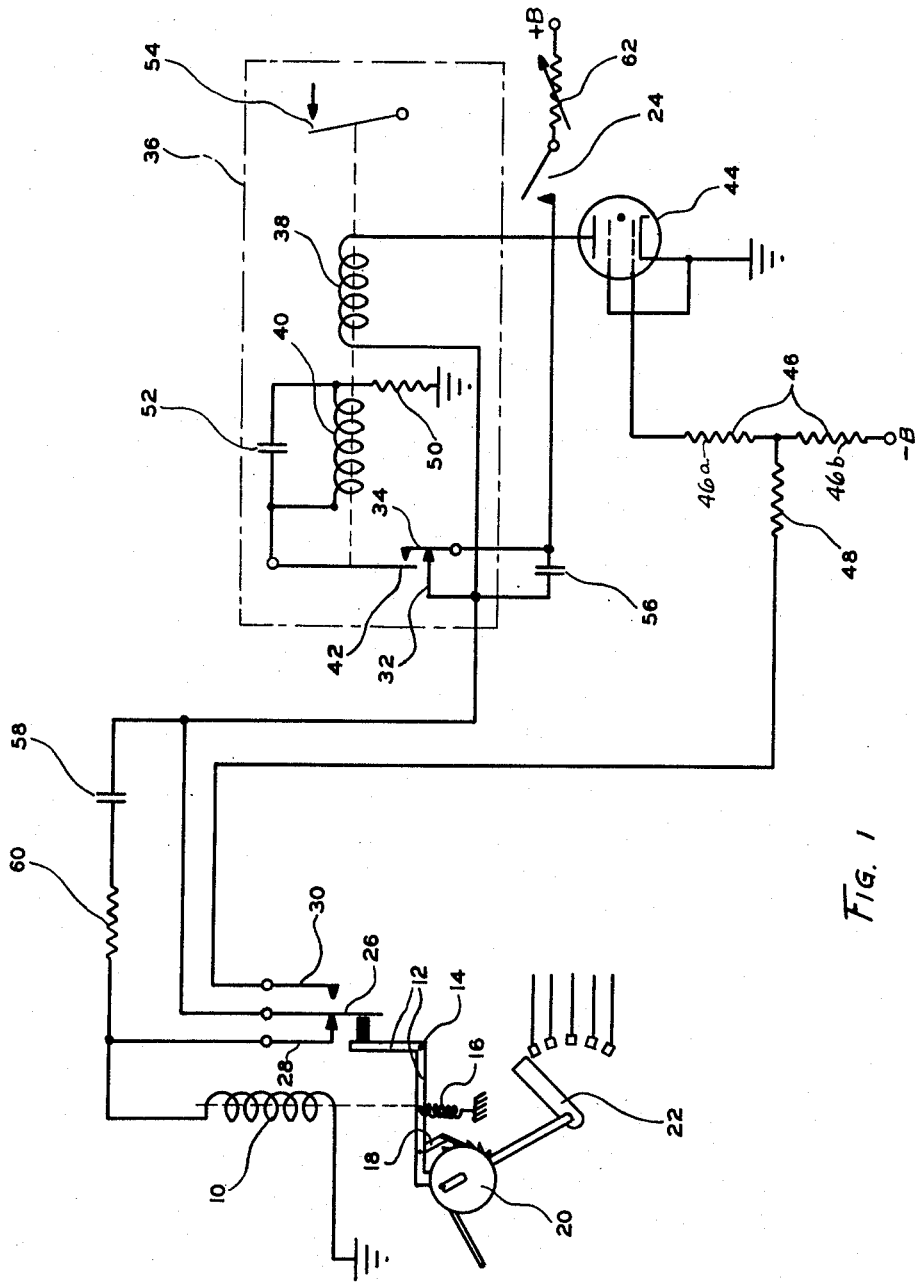

---

2,834,923

CONTROL CIRCUITS FOR ROTARY STEPPING SWITCHES

William A. England, Morristown, N. J., assignor to Monroe Calculating Machine Company, Orange, N. J., a corporation of Delaware Application September 27, 1954, Serial No. 458,310

4 Claims. (Cl. 317—149)

This invention relates to new and useful improvements in control circuits for rotary stepping switches.

There is a need in modern switching systems for a dependable control circuit for effecting high speed single step operations of a rotary stepping switch under influence of electrical impulses which may not terminate until after the switch has completed a step. It is of great importance that the control circuit positively bar plural stepping of the switch in response to a single impulse.

Control circuits are known which can effect the desired single step mode of operation of stepping switches and which can bar plural stepping in response to a single impulse. However, the known circuits are complex and are restricted to low speed operation. Also the known circuits do not provide a positive bar to plural stepping in response to a single impulse.

The principal object of the invention, therefore, is the provision of a dependable, relatively simple, control circuit for effecting higher speed, single step operation of a rotary stepping switch than is possible with the known circuits and which provides a positive bar to plural stepping in response to a single impulse.

According to the invention, impulses for operating a stepping switch are applied to the coil of the latter through contacts of a relay having a low inductance energizing winding to which the impulses are also applied through said contacts, and a high inductance holding winding. A thyratron connected in series with the low inductance winding normally blocks current flow in the latter. The stepping switch is provided with transfer type interrupter contacts which, on transfer thereof fire the thyratron to initiate energization of the low inductance winding. Restoration of the interrupter contacts connects the low inductance winding across the coil of the stepping switch to short circuit the coil until the relay contacts open to disconnect both from the source of impulses.

Other objects and features of the invention will become apparent from the following specification when read in the light of the drawing of which Fig. 1 is a somewhat diagrammatic schematic illustration of the means of the invention.

Referring to Fig. 1 there is shown somewhat diagrammatically a rotary stepping switch comprising a coil 10 and an L-shaped armature 12 biased counter-clockwise about its pivot 14 by a spring 16 but rotatable in the opposite direction under influence of the coil. The armature 12 carries a pawl 18 which cooperates with a ratchet wheel 20 to which the rotary contacts 22 of the stepping switch are secured for rotation. Energization of the coil 10 rotates the armature 12 counter-clockwise to cock the pawl 18, which on restoration of the armature by its spring 16 advances the ratchet wheel 20 one step in a clockwise direction.

The structural details of the stepping switch form no part of the invention and thus need not be described further. It is to be mentioned, however, that the switch may be of any suitable high speed rotary stepping switch of the type utilized in electronic computers and in automatic telephone system selection and timing circuits.

Signals adapted to effect advances of the stepping switch may be obtained from any suitable source. As here shown, they are provided by closing a switch 24 to connect positive supply, B+, say +150 volts, to the coil 10. The connection between the switch 24 and coil 10 includes the interrupter contacts of the stepping switch which, as shown, comprise a transfer leaf 26 which is normally engaged with a back contact 28 but which engages a front contact 30 on energization of the coil 10.

It will be seen, therefore, that cocking of the pawl 18 and transfer of the interrupter contact 26 are controlled by an external signal applied to the coil 10, but that stepping of the ratchet 20 and restoration of the contact 26 are under control of the spring 16 of the stepping switch. Therefore, the transfer of contact 26 may be utilized to preclude further control of the coil 10 by the external signal which has already energized the same, and may also be utilized to initiate timed closing of one or more circuits immediately following a step of the switch.

The connection between the switch 24 and the coil 10 also includes normally closed contacts 32, 34 of a relay 36, provided with a low inductance winding 38 and a high inductance winding 40. Winding 38 provides for rapid energization of the relay while winding 40 serves to maintain the relay in the energized condition. Positive supply is connected to the winding 38 through the normally closed contacts 32, 34 and to winding 40 through the contact 34 and another contact 42 which engages contact 34 on energization of relay 36. The physical relation between the contacts 42, 34 and 32 is such that contact 42 engages contact 34 before contact 34 disengages from contact 32. Winding 40 is connected directly to ground through a resistor 50 but the ground return path for coil 38 is completed through the anode-to-cathode path of a thyratron 44 to whose anode the coil is connected. The cathode and second grid of the thyratron are grounded, while its control grid is connected to the contact 30 of the stepping switch through a voltage divider 46 and a grid limiting resistor 48. The voltage divider 46, having, say, a resistor 46a of 50,000Ω and a resistor 46b 500,000Ω, may be connected to a source of negative potential, B—, say —300 volts, to provide a cut-off bias for the thyratron which is overcome to effect firing of the latter on energization of coil 10 and closure of contacts 26, 30.

The circuit arrangement thus far described is such that on closure of switch 24 a positive operating potential is applied to the coil 10 and effects energization thereof. This actuates armature 12 of the stepping switch and transfer contact 26 of the latter is moved to disengage back contact 28 and to engage front contact 30. Thus, a positively directed signal is applied to the contral grid of thyratron 44 which fires and provides ground return for low inductance winding 38 which is energized. At the same time opening of the contacts 26, 28 disconnects the coil 10 from positive supply and the same is deenergized. Transfer contact 26 then reengages back contact 28 connecting the low inductance and, therefore, low resistance winding 38 across the coil 10 to short circuit the latter.

Energization of winding 38 closes contacts 34, 42 and then opens contacts 32, 34, connecting winding 40 to positive supply and disconnecting coil 10 and winding 38 therefrom. This deenergizes winding 38 and extinguishes thyratron 44. It will be noted that opening of contacts 32, 34 interrupts the short circuiting of coil 10 by winding 38. Winding 40 is later deenergized to restore the circuit to normal, on termination of the signal which initiated the operation thereof, in the present instance, on opening of the switch 24.

It will be seen, therefore, that the means of the invention provide a positive bar to plural stepping of a stepping switch in response to a single signal regardless of the duration of the signal. The low inductance winding 38 short circuits the coil 10 of the stepping switch on restoration of the interruptor contact 26 of the latter to normal and until the relay 36 opens contacts 32, 34 to disconnect the coil 10 from positive supply; and, if the relay fails to open these contacts the winding 38 continues its task of short circuiting coil 10.

In order to hasten deenergization of the relay 36 and, thereby to reduce the interval of time required between successive steps of the rotary switch, a condenser 52 is connected across the winding in familiar fashion. Also the winding 40 and the resistor 50 in series therewith may be so chosen as for the former to be just capable of maintaining relay 36 energized. Thus, it will have an inherently rapid "release time."

In many applications it is desirable to close one or more circuits as soon as the stepping switch has completed a step but not before that time. To this end, a low inductance winding 38 may be chosen which takes at least as long to energize relay 36 as the stepping switch does to step under influence of spring 16 after having been cocked; and relay 36 may include one or more contacts 54 adapted to complete such circuits.

Preferably a condenser 56 is connected across the contacts 32, 34 and a condenser 58 and resistor 60 connected across the contacts 26, 28 to prevent arcing. Also a variable resistor 62 may be inserted in the positive supply connection to switch 24 to permit adjustment of the time constant $$\left(\frac{L}{R}\right)$$

of the circuit of Fig. 1 to speed up or slow down the operations of the stepping switch. Where the adjustable resistor is used a compensating adjustment in the magnitude of the applied voltage may be made to maintain a constant ampere-turn figure for coil 10.

Utilizing the circuit constants shown in Fig. 1, the means of the invention single stepped a standard rotary stepping switch dependably at intervals of approximately .015 second in a test operation. This interval is about half the .030 second interval which can be achieved with the known currently employed circuits.

While there has been above described but a limited number of embodiments of the invention, many modifications and additions may be made therein without departing from the spirit of the invention and it is not desired, therefore, to limit the scope of the invention except as set forth in the appended claims or as directed by the prior art.

I claim:

1. A circuit for effecting single step operations of a stepping switch comprising a stepping switch having an actuating coil, a thyratron, a relay means for applying operating potential to said stepping switch actuating coil, means for firing said thyratron in response to operation of said stepping switch, means for shunting said actuating coil and for operating said relay in response to conduction by said thyratron and means for disconnecting said means for applying operating potential from said actuating coil in response to operation of said relay.

2. A circuit for effecting single step operations of a stepping switch comprising a stepping switch having an actuating coil, a thyratron, a relay, means for applying operating potential to said stepping switch actuating coil, means for firing said thyratron in response to operation of said stepping switch, means for shunting said actuating coil and for operating said relay in response to conduction by said thyratron and means for disconnecting said means for applying operating potential from said actuating coil and for extinguishing said thyratron in response to operation of said relay.

3. A circuit for effecting single step operations of a stepping switch comprising a stepping switch having an actuating coil and a transfer contact connecting front and back contacts controlled by said actuating coil, a relay having a low inductance energizing coil, a holding coil and normally open and normally closed contacts with a common contactor, a thyratron having an anode, a cathode and a control electrode, means for applying operating potential to the common contactor of said relay, one terminal of said energizing coil being connected to the anode of said thyratron, the other terminal of said energizing coil and said transfer contact being connected to said normally closed contact of said relay, one terminal of said actuating coil being connected to said back contact, one terminal of said holding coil being connected to said normally open contact of said relay and ground potential being connected to said thyratron cathode and to the other terminals of said actuating and holding coils.

4. A circuit for effecting single step operations of a stepping switch comprising a stepping switch having an actuating coil and a transfer contact connecting front and back contacts controlled by said actuating coil, said actuating coil being connected between said back contact and ground potential, a relay having a low inductance energizing coil and a holding coil, one terminal of said energizing coil being connected to said transfer contact, a thyratron having its cathode connected to ground potential and its anode connected to the other terminal of said energizing coil, means for applying operating potential to said transfer contact, means for firing said thyratron when said transfer contact connects said front contact and contact means on said relay connecting said means for applying operating potential to one terminal of said holding coil and for disconnecting said means for applying operating potential from said transfer contact in response to energization of said relay, the other terminal of said holding coil being connected to ground potential.

References Cited in the file of this patent

UNITED STATES PATENTS

| | | |
|---|---|---|
| 2,040,425 | Biach | May 12, 1936 |
| 2,178,112 | Barker | Oct. 31, 1939 |
| 2,780,754 | Lovell | Feb. 5, 1957 |